United States Patent
Qi et al.

(10) Patent No.: US 7,583,621 B2
(45) Date of Patent: Sep. 1, 2009

(54) METHOD AND APPARATUS FOR SUPPRESSING ECHO CANCELLING IN A PACKET SWITCHED NETWORK

(75) Inventors: David Cheng-Song Qi, Westford, MA (US); Yan Wang, Arlington, MA (US); Timothy G. Wade, Litchfield, NH (US); William B. Page, Hudson, MA (US)

(73) Assignee: Cisco Technology, Inc., San Jose, CA (US)

( * ) Notice: Subject to any disclaimer, the term of this patent is extended or adjusted under 35 U.S.C. 154(b) by 617 days.

(21) Appl. No.: 10/958,751

(22) Filed: Oct. 5, 2004

(65) Prior Publication Data

US 2006/0072484 A1    Apr. 6, 2006

(51) Int. Cl.
  *H04B 3/20* (2006.01)
(52) U.S. Cl. ..................................... 370/286
(58) Field of Classification Search ................. 370/286
  See application file for complete search history.

(56) References Cited

U.S. PATENT DOCUMENTS

| | | | |
|---|---|---|---|
| 5,420,921 A | | 5/1995 | Lähdemäki |
| 5,533,121 A | | 7/1996 | Suzuki et al. |
| 5,875,246 A | | 2/1999 | Houghton |
| 6,212,374 B1 | * | 4/2001 | Scott et al. ............... 455/422.1 |
| 6,229,846 B1 | | 5/2001 | Lassig et al. |
| 6,400,802 B1 | | 6/2002 | Legare |
| 6,504,838 B1 | | 1/2003 | Kwan |
| 6,549,587 B1 | | 4/2003 | Li |
| 6,584,110 B1 | | 6/2003 | Mizuta et al. |
| 6,738,358 B2 | * | 5/2004 | Bist et al. .................... 370/289 |
| 6,754,232 B1 | * | 6/2004 | Tasker ......................... 370/477 |
| 6,765,931 B1 | | 7/2004 | Rabenko et al. |
| 6,993,007 B2 | | 1/2006 | Gummalla et al. |
| 7,002,992 B1 | | 2/2006 | Shaffer et al. |
| 7,075,979 B2 | | 7/2006 | Beadle et al. |
| 7,263,107 B1 | | 8/2007 | Johnston et al. |
| 7,411,941 B2 | | 8/2008 | Chu et al. |
| 2001/0021186 A1 | | 9/2001 | Ono et al. |
| 2001/0046259 A1 | | 11/2001 | Abrishami |
| 2002/0064139 A1 | * | 5/2002 | Bist et al. .................... 370/289 |
| 2002/0080730 A1 | | 6/2002 | LeBlanc |
| 2002/0101830 A1 | | 8/2002 | LeBlanc |

(Continued)

OTHER PUBLICATIONS

XP-002362870, "tone incoming [ip/pstn] ans disable echo suppressor," Tone Incoming CLIs, 5 pages, May 11, 2004.

*Primary Examiner*—Alexander Jamal
(74) *Attorney, Agent, or Firm*—Hamilton, Brook, Smith & Reynolds, PC

(57) ABSTRACT

A method, or corresponding apparatus, assumes a call is a Voice Band Data (VBD) call. The method disables a local echo canceller and transmits a tone that disables distal echo canceller(s) along a communications path across which the call is communicated. After disabling the echo cancellers, the echo cancellers are allowed to operate in a typical manner, such as according to ITU standards, after the call is established, including remaining disabled if the call is a Voice Band Data call and being automatically enabled if the call is or becomes a voice call. The method or apparatus is particularly useful in networks having Point of Service (POS) devices that have modems that do not send out a 2100 Hz tone to disable echo cancelling in the communications path. In one embodiment, the method or corresponding apparatus is deployed in a gateway.

28 Claims, 3 Drawing Sheets

U.S. PATENT DOCUMENTS

| | | |
|---|---|---|
| 2002/0141392 A1 | 10/2002 | Tezuka et al. |
| 2003/0091034 A1 | 5/2003 | Koistinen et al. |
| 2003/0095544 A1* | 5/2003 | Chu .......................... 370/352 |
| 2003/0193696 A1 | 10/2003 | Walker et al. |
| 2004/0190499 A1* | 9/2004 | Chen et al. .................. 370/352 |
| 2006/0285171 A1 | 12/2006 | Ma et al. |

* cited by examiner

METHOD AND APPARATUS FOR SUPPRESSING ECHO CANCELLING IN A PACKET SWITCHED NETWORK

BACKGROUND OF THE INVENTION

Traditional analog and Time Division Multiplexed (TDM) telephone networks provide a "virtual direct connection" between endpoints with minimal perceived echo problems due to a pseudoacoustic effect of echo in a low delay environment. As telephone service providers deploy voice services using an Internet Protocol (IP) network and other packet switched networks, voice users, in particular, find some calls unacceptable as the additional packet delay causes echoes to have an increased perception. Much work has been done in the area of echo cancellation and improving voice quality for digital voice signals. Indeed, most gateway (GW) products now include echo cancellation as a network feature. The IP network that provides voice services are referred to as Voice-over-IP (VoIP) networks. Almost all VoIP networks also provide data services that are referred to as Voice Band Data (VBD) services. During a VBD call connection, any echo canceller in the communications path degrades the VBD service due to the echo cancellers' altering the data signal and causing unexpected errors.

According to International Telecommunications Union (ITU) standards, if a 2100 Hz tone is detected by any telecommunications switch, it disables its echo canceller. This is the reason that most modems send out a 2100 Hz Answer Back Tone (ABT) prior to any training and connection. However, there are still many modems that do not send out a 2100 Hz tone to disable echo cancellers in the communications path. These modems are widely used in Point of Service (POS) devices, such as credit card clients, that use a low rate modulation modem using v.32 and lower rate modulations, such as v.22, v.22 bis, etc. POS devices are sometimes alternatively referred to as point of sale devices.

Therefore, if an echo canceller is enabled during a VBD call, the connection is unreliable. If the echo canceller is disabled in the communications path (e.g., a voice gateway), during a voice call, it causes a normal voice call to experience an echo problem. Furthermore, if there is an echo canceller in the communications path external from a local gateway, there is no way to disable the external echo canceller for VBD calls through use of the local gateway.

SUMMARY OF THE INVENTION

There is no known solution to solve the problems described in reference to the prior art. The VoIP gateway allows a user to disable its echo canceller manually, and the echo canceller is disabled if there is a 2100 Hz tone presented to it via the communications path. However, presently, there is no way for a VoIP gateway to disable an external echo canceller.

Accordingly, the principles of the present invention include a method and corresponding apparatus to disable any external echo canceller for Voice Band Data (VBD) service enabled on the VoIP gateway.

One embodiment according to the principles of the present invention includes a method, or corresponding apparatus, of suppressing echo cancelling in a packet switched communications network. The method includes disabling a local echo canceller in a local network node through which a call supported by the local network node and a distal network node is established via the packet switched communications network. After a connection of the call is established, the method transmits a tone that disables a distal echo canceller in the distal network node. The method also allows the echo cancellers to operate in a typical manner (e.g., according to ITU standards) after the call is established, including remaining disabled if the call is a VBD call and automatically enabling if the call is or becomes a voice call.

In one embodiment, the tone is a 2100 Hz tone with phase reversal. The tone may also be adjustable in length, such as 500 msec, 100 msec, 1000 msec, or anywhere in-between. Longer or shorter length may also be acceptable depending on network specifications. The method may also allow for selectively enabling or disabling transmitting the tone.

In one embodiment, disabling the local echo canceller occurs before transmitting the tone; in an alternative embodiment, disabling the local echo canceller occurs after transmitting the tone. In yet another embodiment, disabling the local echo canceller can occur simultaneously while transmitting the tone. Transmitting the tone may be performed by transmitting data, such as in a file, that represents the tone.

The method may be used in connection with a communications path associated with a Point of Service (POS) device having a modem that does not send out a 2100 Hz tone to disable echo cancelling in the communications path. In one network implementation, at least one of the network nodes is a gateway (GW).

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
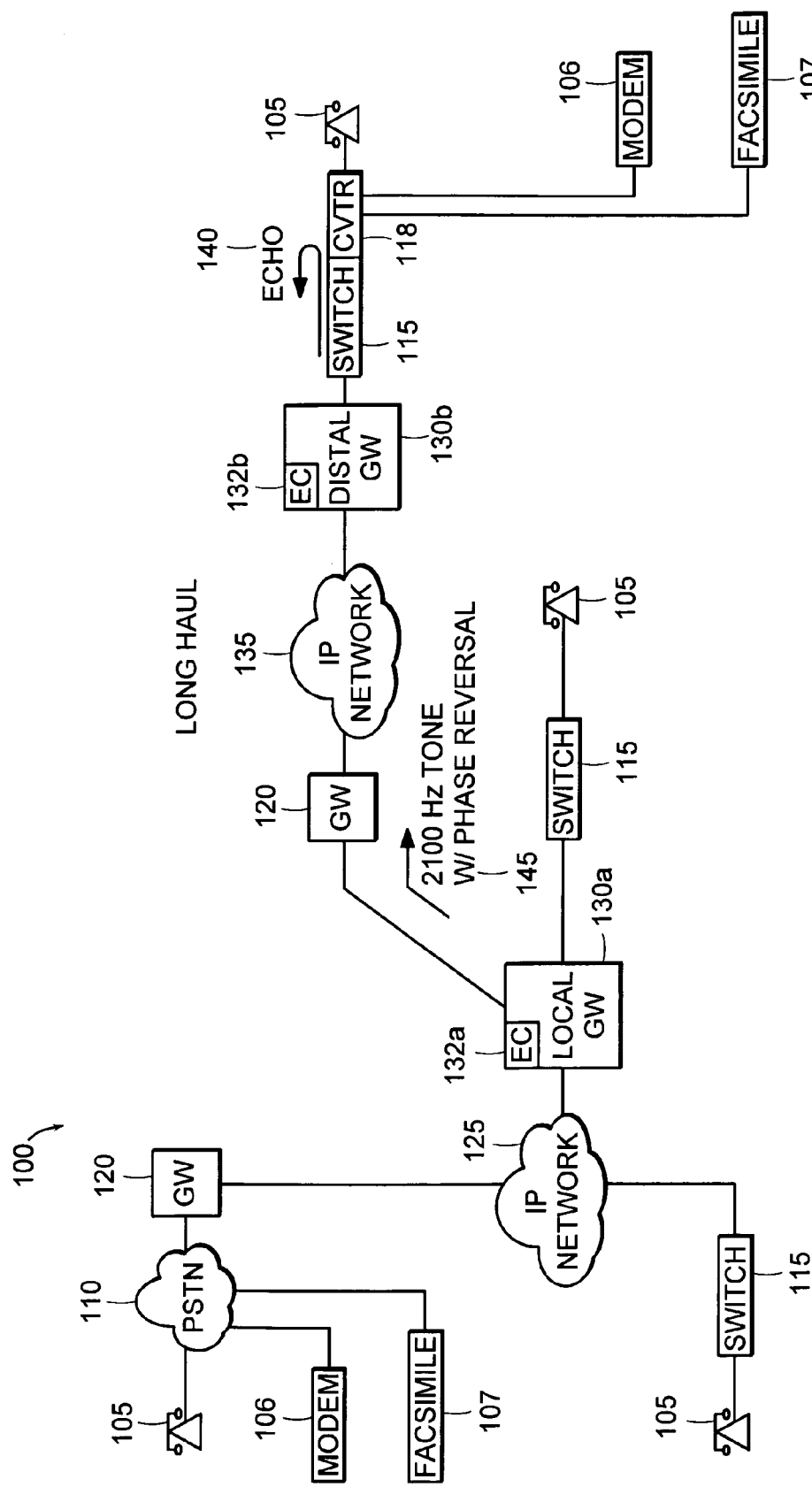
FIG. 1 is a network diagram in which a gateway (GW) employs the principles of the present invention.

A description of preferred embodiments of the invention follows.

According to International Telecommunications Union (ITU) standards, if a 2100 Hz tone is detected by any telecommunications switch or equipment, it shall disable its echo canceller. Upon detection of 250 ms of silence in both directions, the switch or equipment reenables its echo canceller automatically. This method is widely used in data-only networks, such as modem and facsimile call networks. Once a terminating modem or facsimile machine receives a call, it sends out a 2100 Hz Answer Back Tone (ABT) to disable any echo cancellers between an originating modem or facsimile machine and itself.

The principles of the present invention use a similar method but on a Voice-over-Internet-Protocol (VOIP) environment to cover cases where some answering devices (e.g., modem/facsimile machines) do not send a 2100 Hz ABT. As soon as a phone number is dialed and before the call is connected, a voice gateway or other network node transmits a short 2100 Hz tone to the called party. This ensures all echo cancelling between the gateway or other network node and the called party are disabled.

The 2100 Hz tone is preferably short and of low enough power to disable external echo cancellers without subjecting the called party to a bothersome tone. A process according to the principles of the present invention may be implemented within a gateway's echo canceller or associated processor and may be configurable in various ways. For example, the configuration may include tone length, tone power, and enable/disable.

In one embodiment, the gateway or network node is able to configure itself to treat all calls as data calls, as an assumption, and send out a 2100 Hz tone to disable echo canceller(s) in other gateway(s). In this way, the gateway can disable its own echo canceller and turn it on upon silence detection. The following steps describe an example process for implementing the principles of the present invention:

1. Enable the feature in a communications line or channel, preferably if the line or channel will most likely handle calls from Point of Service (POS) devices that use low rate modulation modems, such as v.32, v.22, v.22 bis, etc.

2. The gateway or network node turns off its echo canceller at the beginning of the call.

3. The gateway sends a short 2100 Hz tone after the number is dialed, which disables echo cancellers in the communications path.

4. If the communications path carries a Voice Band Data (VBD) call, it establishes the call with no echo canceller in the path to ensure a reliable connection. The echo canceller stays off during the VBD call since no bi-directional silence is present in the path. If the call is a voice call, the gateway detects bi-directional and/or voice and enables its echo canceller. External echo cancellers are enabled in the same manner.

In summary, a voice gateway transmits a 2100 Hz tone towards network nodes (e.g., gateways) associated with a Public Switched Telephone Network (PSTN) to disable external echo cancellers as soon as a call is established.

A process, or corresponding method, according to the principles of the present invention is easy to implement and has the following advantages:

1. There is no detection algorithm needed to detect external echo cancellers. Algorithms to detect external echo cancellers may be complicated and can also introduce false detection. In the event of false detection, external echo cancellers can be disabled, thereby reducing voice quality in the communications line for a voice call.

2. The process is easy to implement, is reliable, and requires low memory usage.

3. The process is transparent to external equipment that also has an echo canceller since all telecommunications equipment that has an echo canceller is designed to disable its echo canceller to be compliant with ITU standards. The process takes advantage of the standard and need not change equipment or processes in the voice network.

Referring now to FIG. 1, a communications network 100 includes example communications networks devices. These devices include telephones 105, modems 106, and facsimile machines 107. The network devices 105, 106, and 107 may be connected to a Public Switched Telephone Network (PSTN) 110 or switch 115. The switches 115 include a 2-wire-to-4-wire converter (CVTR) hybrid that are well known to cause echoes 140 of signals transmitted between the communications devices 105, 106, and 107. The modems 106 may be a Point-of-Service (POS) device credit card client or any low rate modulation modem. As described above, the POS device is not equipped to disable echo cancellers in the communications path.

Continuing to refer to FIG. 1, the PSTN 110 is in communication with a gateway (GW) 120. The gateway 120 is connected to an Internet Protocol (IP) network 125. Similarly, the switch 115 is also connected to the IP network 125.

A local gateway 130a that includes an echo canceller (EC) 132a is connected to the IP network 125 and also to a switch 115 and a gateway 120. This gateway 120 is connected to another IP network 135, to which a distal GW 130b with an echo canceller 132b is connected. The distal GW 130b is connected to a switch 115 with a converter 118, which is connected to some end user communications devices 105, 106 and 107. The local and distal gateways 130a, 130b may be the same as or different from the other gateways 120, but are given different reference numbers herein for purposes of discussion. The other gateways 120 may also include echo cancellers 132a, 132b, but are unnecessary to describe the principles of the present invention.

The communications path between the local gateway 130a and distal gateway 130b is a "long haul" communications path, which means that echoes traveling on this communications path will become noticeable to the point of distorting voice signals. To remove the echoes 140, one of the gateways 130a or 130b or both enable their echo cancellers 132a, 132b. However, in the case of VBD transmissions, the echo cancellers 132a, 132b may distort VBD signals, thereby causing data errors or possibly disruption of communications service.

As described above, a network node, such as the local gateway 130a assumes that all calls are VBD calls and transmits a tone, such as a 2100 Hz tone with phase reversal, to the distal gateway 130b via a communications path. Responsively, the distal echo canceller 132b is disabled. The local gateway 132a, prior to or after transmitting the tone, disables its echo canceller 132a. In this way, the echo canceller 132a, 132b in the long haul communications path that experiences significant echo 140 is free from echo cancelling, thereby allowing VBD transmissions to occur unfettered. Similarly, the local gateway 130a may transmit the same tone 145 to other gateways 120 to disable their echo cancellers. It should be understood that the tone 145 may be a 2100 Hz tone or other frequency or frequencies now or later defined for disabling echo cancellers.

After disabling the echo cancellers 132a, 132b, the local gateway 130a, or an associated network node employing the method just described, allows the echo cancellers 132a, 132b to operate in a typical manner, such as adhering to ITU standards, including remaining disabled if the call is a voice band data call and automatically enabling if the call is or becomes a voice call.

Figure 2:
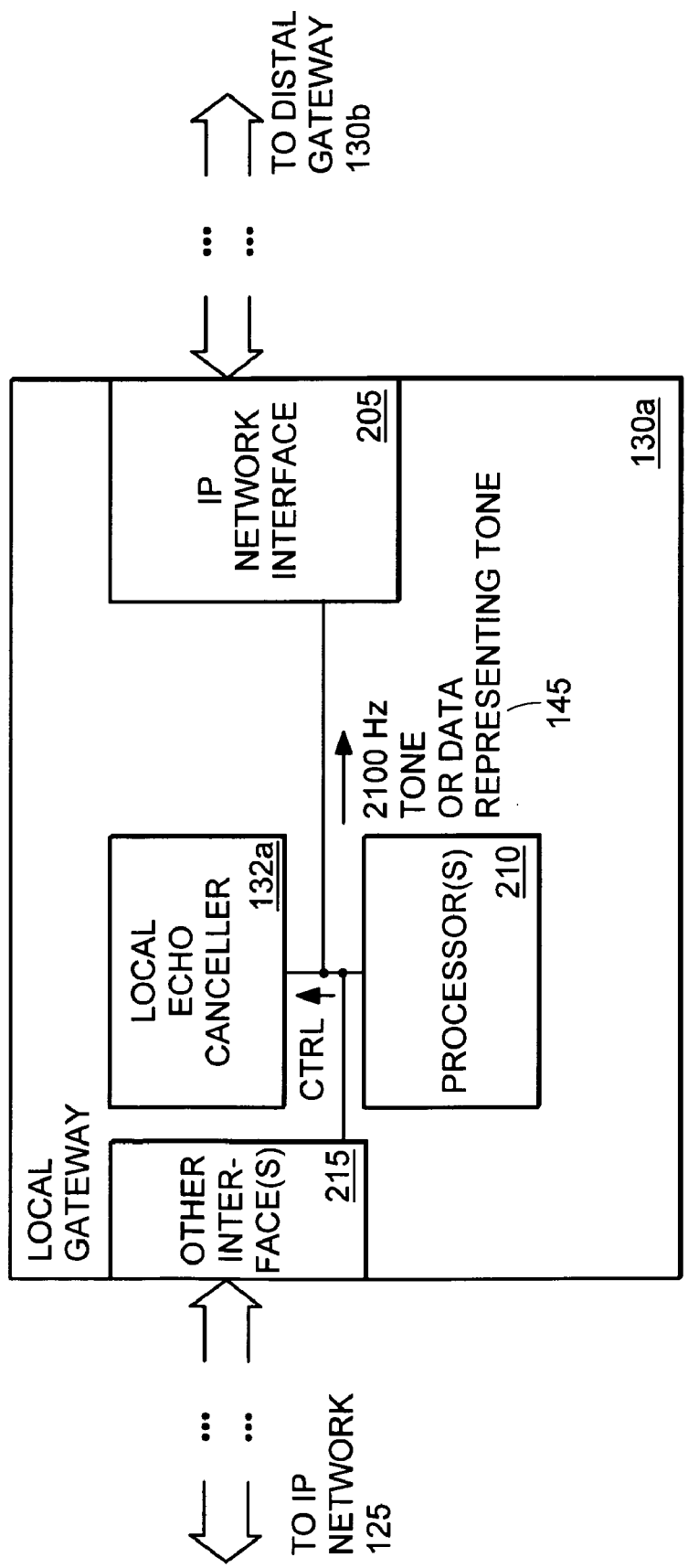
FIG. 2 is a block diagram of the gateway of FIG. 1 in which the principles of the present invention are employed.

FIG. 2 is a block diagram of the local gateway 130a. The local gateway 130a includes an IP network interface 205, processor(s) 210, local echo canceller 132a, and other interfaces 215. The IP network interface 205 is in communication with the distal gateway 130b, and the other interface(s) 215 is in communication with the IP network 125 of FIG. 1.

In operation, the processor(s) 210 in the embodiment of FIG. 2 may control (i.e., enable or disable) the local echo canceller 132a and transmit a 2100 Hz tone, or transmit data representing the tone in the form of a file or otherwise, to the distal gateway 130b via the IP network interface 205. The processor(s) 210 may also execute other processes related to or distinct from the methods described herein.

In alternative embodiments, the processor(s) 210 may be integrated into the local echo canceller 132a or other circuitry in the local gateway 130a. The processor(s) 210 may also be located in another network node external from the local gateway 130a and support the techniques described herein.

It should be understood that the processor(s) 210 may be a general purpose processor, digital signal processor, custom designed processor, or other form of processor implemented in hardware, firmware or executing software. When executing software, the processor loads processor instructions from a computer readable medium and executes the program instructions in a typical manner. The computer readable medium may be Random Access Memory (RAM), Read Only Memory (ROM), optical or magnetic disk, removable memory, or other type of computer readable media. It should also be understood that the program instructions may be located external from the processor(s) 210, in which case they are downloaded or uploaded via a communications network using various communications network techniques.

Figure 3:
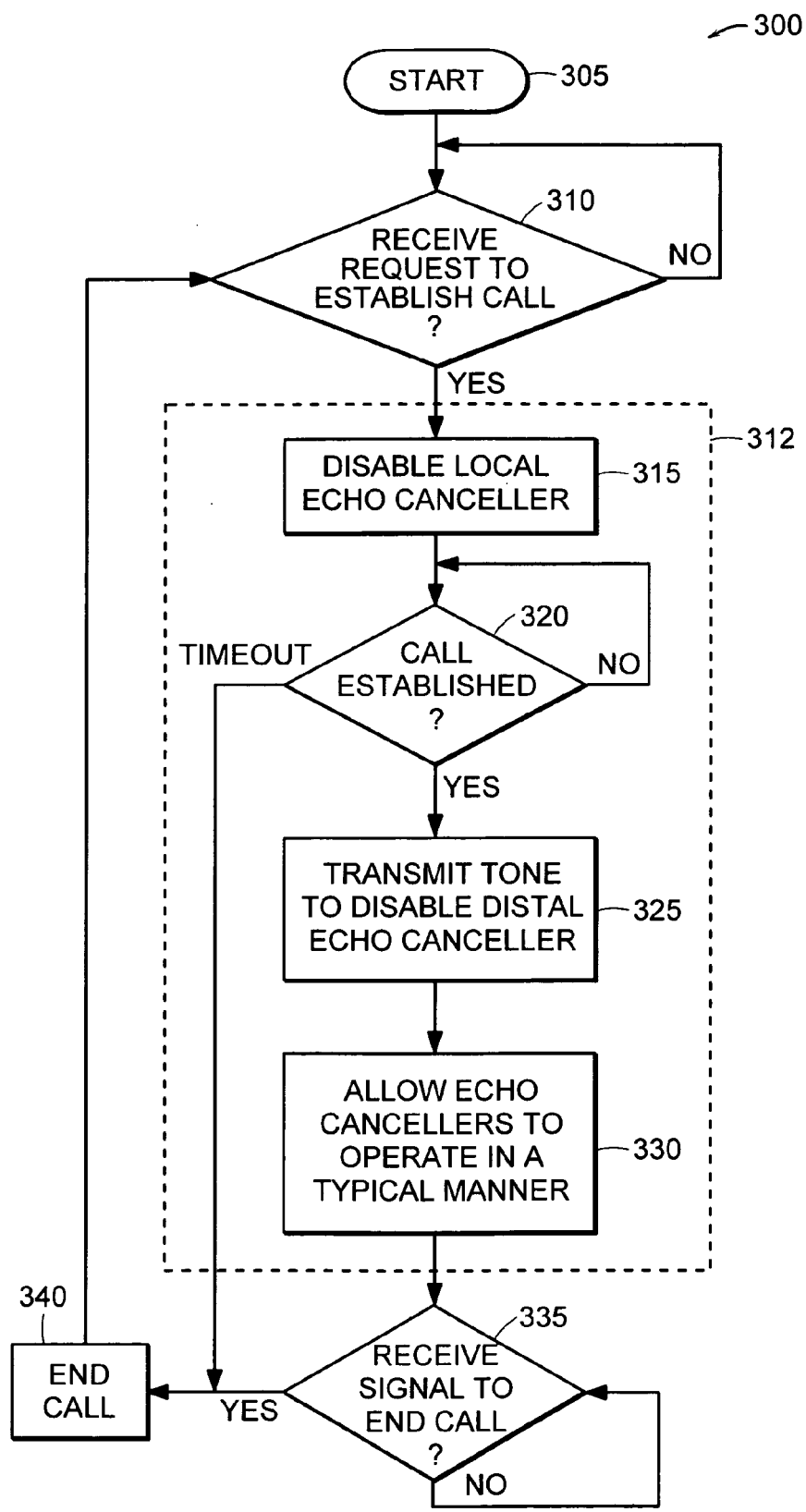
FIG. 3 is a flow diagram of a process executed by the gateway of FIGS. 1 and 2.

FIG. 3 is a flow diagram of a process 300 that may be executed by the processor(s) in the local gateway 130a of FIGS. 1 and 2. The process 300 starts (step 305) and determines whether it has received a request to establish a call (step 310). If a request has not been received, the process 300 continues to wait until a request is received. If a request to establish a call is received, the process 300 continues and executes a subprocess 312, according to the principles of the present invention, that appropriately enables and disables echo cancellers in a communications path based on whether the call is a VBD call or voice call.

The subprocess 312 disables the local echo canceller (step 315). Disabling the local echo canceller may occur as early as before or during dialing numbers to establish the call or may be executed after the call has been established (i.e., connected), in which case steps 315 and 320 are reversed. In the subprocess 312 illustrated in FIG. 3, after disabling the local echo canceller, the subprocess 312 waits until the call has been established (step 320). If a timeout occurs, the call is ended (step 340). If the call has been established, a tone is transmitted to disable the distal echo canceller (step 325). After both local and distal echo cancellers 132a, 132b, respectively, have been disabled, the subprocess 312 allows the echo cancellers to operate in a typical manner (step 330), which includes remaining disabled if the call is a VBD call and automatically enabling if the call is or becomes a voice call, as determined through use of voice detection or silence detection of greater than 250 msec.

After the subprocess 312 is complete, the process 300 determines whether a signal to end the call has been received (step 335). Once the signal is received, the process 300 ends the call (step 340) and returns to wait to receive a request to establish a call (step 310).

It should be understood that the process 300 may be implemented in various programming languages when implemented in software. It should also be understood that the process 300 may be reorganized depending on various network communications factors that are known or learned during implementation.

The tone transmitted may be adjustable in length. Example lengths include 500 msec, 100 msec, 1000 msec, or lengths therebetween. Lengths below 100 msec or above 1000 msec may also be used depending on the network and applicable standards associated with network communications. The length of tone may be increased or decreased beyond this range based on implementation factors.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of suppressing echo cancelling in a packet switched communications network, the method comprising:
   disabling a local echo canceller in a local network node, through which a call supported by the local network node and a distal network node is established, via the packet switched communications network, in a presence of a request to establish either a voice band data call or voice call; and
   after a connection of either the voice band data call or the voice call is established, transmitting a tone, via a local gateway, that disables a distal echo canceller in the distal network node.

2. The method according to claim 1 further including allowing the echo cancellers to operate in a typical manner after the call is established, including remaining disabled if the call is a voice band data call and automatically enabling if the call is or becomes a voice call.

3. The method according to claim 1 wherein the tone is a 2100 Hz tone with phase reversal.

4. The method according to claim 1 wherein the tone is adjustable in length between 100 msec and 1000 msec.

5. The method according to claim 1 further including selectively enabling or disabling transmitting the tone.

6. The method according to claim 1 wherein disabling the local echo canceller occurs before, simultaneously with, or after transmitting the tone.

7. The method according to claim 1 wherein transmitting the tone includes transmitting data representing the tone.

8. The method according to claim 1 used in connection with a communications path associated with a Point of Service (POS) device unequipped to disable echo cancelling.

9. The method according to claim 1 wherein at least one of the network nodes is a gateway.

10. An apparatus for suppressing echo cancelling in a packet switched communications network, the apparatus comprising:
    a local echo canceller in a local network node through which a call supported by the local network node and a distal network node is established;
    a local network interface adapted to communicate with a distal network interface in the distal network node via the packet switched communications network, the distal network node including a distal echo canceller; and
    a processor in communication with the local echo canceller and local network interface that:
    disables the local echo canceller, in a presence of a request to establish either a voice band data call or voice call; and
    after a connection of either the voice band data call or the voice call is established, transmits a tone via the local interface that disables the distal echo canceller.

11. The apparatus according to claim 10 wherein the processor further allows the echo cancellers to operate in a typical manner after the call is established, including remaining disabled if the call is a voice band data call and being automatically enabled if the call is or becomes a voice call.

12. The apparatus according to claim 10 wherein the tone is a 2100 Hz tone with phase reversal.

13. The apparatus according to claim 10 wherein the tone is adjustable in length between 100 msec and 1000 msec.

14. The apparatus according to claim 10 wherein the processor further selectively enables or disables transmitting of the tone.

15. The apparatus according to claim 10 wherein the processor disables the local echo canceller before, simultaneously with, or after it transmits the tone.

16. The apparatus according to claim 10 wherein the processor transmits the tone in the form of data representing the tone.

17. The apparatus according to claim 10 used in connection with a communications path associated with a Point of Service (POS) device unequipped to disable echo cancelling.

18. The apparatus according to claim 10 wherein at least one of the network nodes is a gateway.

19. A computer program product having a computer readable medium including computer program logic recorded thereon that, when executed on a computer processor, causes the processor to:
- disable a local echo canceller in a local network node through which a call supported by the local network node and a distal network node is established via a packet switched communications network, in a presence of a request to establish either a voice band data call or voice call; and
- after a connection of either the voice band data call or the voice call is established, transmit a tone, via a local gateway, that disables a distal echo canceller in the distal network node.

20. The computer program product according to claim 19 further including logic that causes the processor to allow the echo cancellers to operate in a typical manner after the call is established, including remain disabled if the call is a voice band data call and automatically enable if the call is or becomes a voice call.

21. The computer program product according to claim 19 wherein the tone is a 2100 Hz tone with phase reversal.

22. The computer program product according to claim 19 wherein the tone is adjustable in length between 100 msec and 1000 msec.

23. The computer program product according to claim 19 further including logic causing the processor to selectively enable or disable transmitting the tone.

24. The computer program product according to claim 19 wherein the logic that causes the processor to disable the local echo canceller causes the disabling to occur before, simultaneously with, or after causing the processor to transmit the tone.

25. The computer program product according to claim 19 wherein the logic that causes the processor to transmit the tone include instructions that cause the processor to transmit data representing the tone.

26. The computer program product according to claim 19 used in connection with a communications path associated with a Point of Service (POS) device unequipped to disable echo cancelling.

27. The computer program product according to claim 19 wherein at least one of the network nodes is a gateway.

28. An apparatus for suppressing echo cancelling in a packet switched communications network, the apparatus comprising:
- means for disabling a local echo canceller in a local network node through which a call supported by the local network node and a distal network node is established via the packet switched communications network, in a presence of a request to establish either a voice band data call or voice call; and
- means for transmitting a tone, via a local gateway, that disables a distal echo canceller in the distal network node after a connection of either the voice band data call or the voice call is established.

* * * * *

UNITED STATES PATENT AND TRADEMARK OFFICE
CERTIFICATE OF CORRECTION

PATENT NO. : 7,583,621 B2 Page 1 of 1
APPLICATION NO. : 10/958751
DATED : September 1, 2009
INVENTOR(S) : Qi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 893 days.

Signed and Sealed this

Fourteenth Day of September, 2010

David J. Kappos
*Director of the United States Patent and Trademark Office*